United States Patent
Han et al.

(10) Patent No.: US 10,877,134 B2
(45) Date of Patent: Dec. 29, 2020

(54) LIDAR PEAK DETECTION USING SPLINES FOR AUTONOMOUS DRIVING VEHICLES

(71) Applicant: Baidu USA LLC, Sunnyvale, CA (US)

(72) Inventors: Yang Han, Sunnyvale, CA (US); Yaoming Shen, Sunnyvale, CA (US); Xiangfei Zhou, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 144 days.

(21) Appl. No.: 16/194,939

(22) Filed: Nov. 19, 2018

(65) Prior Publication Data

US 2020/0158834 A1    May 21, 2020

(51) Int. Cl.
| | |
|---|---|
| *G01S 7/486* | (2020.01) |
| *G01S 17/93* | (2020.01) |
| *G05D 1/00* | (2006.01) |
| *G05D 1/02* | (2020.01) |
| *G01S 7/4865* | (2020.01) |
| *G01S 7/4861* | (2020.01) |
| *G01S 17/931* | (2020.01) |

(52) U.S. Cl.
CPC .......... *G01S 7/4865* (2013.01); *G01S 7/4861* (2013.01); *G01S 17/931* (2020.01); *G05D 1/0088* (2013.01); *G05D 1/0231* (2013.01); *G05D 2201/0213* (2013.01)

(58) Field of Classification Search
CPC .... G01S 7/4865; G01S 17/931; G01S 7/4861; G01S 7/4866; G01S 17/89; G05D 1/0088; G05D 1/0231; G05D 2201/0213
USPC .......................................................... 701/23
See application file for complete search history.

(56) References Cited

U.S. PATENT DOCUMENTS

2018/0306926 A1* 10/2018 LaChapelle .......... G01S 7/4817

\* cited by examiner

*Primary Examiner* — Brian P Sweeney
(74) *Attorney, Agent, or Firm* — Womble Bond Dickinson (US) LLP

(57) ABSTRACT

A two dimensional LIDAR scanning system uses a low sampling rate (250-500 MHz) analog to digital convertor (ADC) to sample an analog signal representing a reflection of a laser beam off of an object scanned by the LIDAR device. A splining method creates a representation of the analog signal using the sample points. The representation of the analog signal is used to detect a peak magnitude of the reflected laser beam and a time at which the peak magnitude occurred relative to the emission of the laser beam. A plurality of laser emitters and associated analog sensor outputs can be multiplexed into a single signal that is sequentially sampled by a single ADC with any sampling rate, at, e.g. 500 mega-samples per second. The plurality of samples of each analog signal are a representation of each analog signal generated from the plurality of samples using a splining method.

23 Claims, 10 Drawing Sheets

LIDAR PEAK DETECTION USING SPLINES FOR AUTONOMOUS DRIVING VEHICLES

TECHNICAL FIELD

Embodiments of the present disclosure relate generally to LIDAR sensors for use with an autonomous driving vehicle (ADV).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

One of the onboard sensors in an autonomous driving vehicle (ADV) is a light detection and ranging ("LIDAR"). LIDAR can be used by an ADV to detect objects surrounding the ADV while driving. LIDAR can also be used to generate and/or update a high-definition map representing objects surrounding the ADV, such as buildings, roadways, signs, trees, and other objects that may appear in a high definition map.

For onboard LIDAR to be effective in detecting objects surrounding the ADV, the scanning for objects must be performed quickly and capture as much information surrounding the ADV as possible. LIDAR scanning of an object includes emitting a laser beam and detecting a peak intensity of a reflection of the laser beam off of the object.

Prior art methods of determining a peak intensity of the reflected laser beam utilize one or more high sampling rate analog-to-digital converters (ADCs), such as 1 Giga-samples/second (1 Gs/s) to 3 Giga-samples/second (1 s/s). A 1 Gs/s ADC sampling rate represents 1 nanosecond (1 ns) accuracy, which translates to about 15 centimeters (15 cm) distance accuracy. However, a 1 Gs/s ADC with the necessary resolution costs about $300 to $500 each. A LIDAR system may incorporate 16 LIDAR sensing channels, each of which includes a 1 Gs/s ADC, making the overall LIDAR system quite expensive as a proportion of the cost of an ADV. In addition, the computational resources needed to process a reflected laser beam at 1 Gs/s are substantial, such that the computational cycle for processing a reflection of a single LIDAR scanning laser beam can limit the frequency with which a sequence of LIDAR scanning laser beams can be emitted, reflected, sampled with the ADC at 1 Gs/s, and the sampled data processed and used by an ADV perception and planning system.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
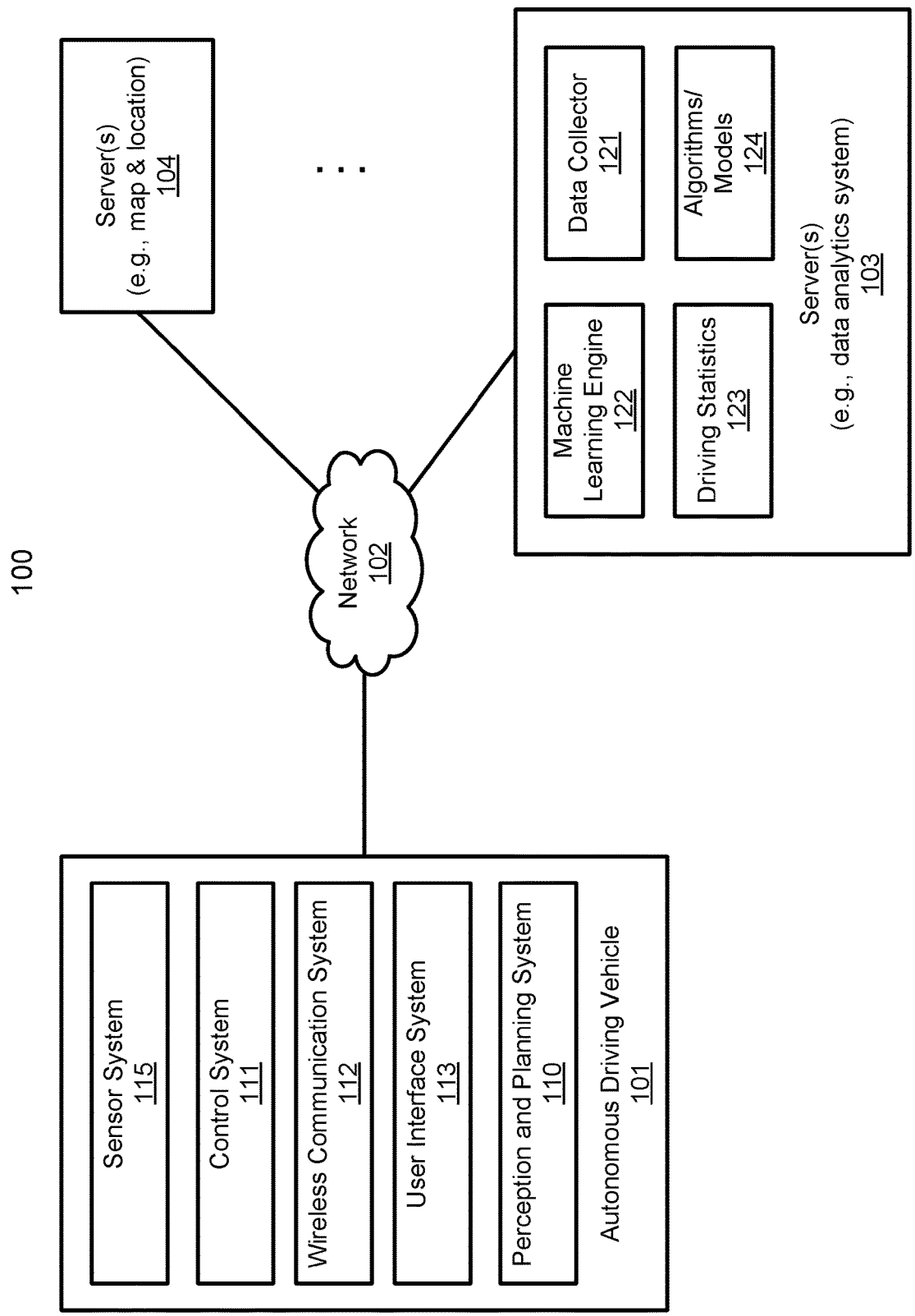
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

In a first embodiment, a LIDAR device for use in an autonomous driving vehicle (ADV) includes a first laser emitter to emit a first laser beam, a first sensor that detects a reflection of the first laser beam, a first converter device that converts an output of the first sensor from a current to a first voltage signal representing the reflection of the first laser beam, and an analog-to-digital converter (ADC) configured to measure a first plurality of sample points from the first voltage signal. A splining module is configured to generate a representation of the first voltage signal using the first plurality of sample points. A peak detection module is configured to determine a peak magnitude of the first voltage signal using the representation of the first voltage signal, and to determine a time at which the peak magnitude of the reflection of the first laser beam occurred. A processing module of a controller can be coupled to the ADC, the splining module, and the peak detection module. The processing module can be configured to generate LIDAR information from the peak magnitude and a time-of-flight from emitting the first laser beam to the time at which the peak magnitude of the reflection of the first laser beam occurred. The LIDAR information is utilized to navigate the ADV responsive to one or more obstacles detected by the LIDAR device. In an embodiment, the first sensor can be an avalanche photodiode (APD). In an embodiment, the APD begins outputting a current representing an intensity and time information of the received reflected laser beam. The processing module can be further configured to correlate the peak magnitude of the representation of the first voltage signal to an intensity of the reflected first laser beam. In an embodiment, the splining module can be configured to assume that a pulse shape of the reflection of the first laser beam is substantially symmetric (Gaussian shape pulse). The peak magnitude of the reflected first laser beam can be determined as a maximum value for the representation of the first voltage signal. In an embodiment, the converter device comprises a transimpedance amplifier (TIA). In an embodiment, the ADC can sample the first voltage signal at a rate between 250 mega-samples per second (250 Ms/s) and 500 Ms/s.

In a second embodiment, adding to the first embodiment, the LIDAR device of the first embodiment can further include a time-division high-speed analog multiplexer (MUX), a second laser emitter, a second sensor, and a second converter device. The second laser emitter can emit a second laser beam. The second sensor can detect a reflection of the second laser beam. The second converter device can convert an output of the second sensor from a current to a second voltage signal representing the reflection of the second laser beam. The MUX time-division can multiplex the first voltage signal and the second voltage signal, and pass the multiplexed first and second voltage signals to the ADC at different times to allow the ADC to sample one signal at a time. The multiplexer effectively concatenates parallel sensor outputs from different sensors into a series manner in ADC level. The ADC can be further configured to measure a plurality of samples of the second voltage signal. The splining module can be further configured to generate a representation of the second voltage signal using the second plurality of samples, in addition to the representation of the first voltage signal using the first plurality of samples. The peak detection module can be further configured to determine a peak magnitude of the representation of the second voltage signal and to determine a time at which the peak magnitude of the representation of the second voltage signal occurred, in addition to the peak magnitude of the representation of the first voltage signal and to determine a time at which the peak magnitude of the representation of the first voltage signal occurred. The processing module can be further configured to generate LIDAR information from the peak magnitude and a time-of-flight from emitting the second laser beam to the time which the peak magnitude of the representation of the second voltage signal occurred, in addition to generating LIDAR information from the peak magnitude and the time-of-flight from emitting the first laser beam to the time at which the peak magnitude of the representation of the first voltage signal occurred. In an embodiment, the LIDAR device can further include a third and a fourth laser emitter, sensor, and a converter device. The ADC can be a 500 mega-samples per second (500 Ms/s) ADC, and the MUX can be a 4×1 multiplexer. The 4×1 multiplexer can time-division multiplex the first, second, third, and fourth voltage signals onto a single signal path to the ADC. The ADC can sample, in sequence, the first, second, third, and fourth voltage signals to produce first, second, third, and fourth pluralities of samples. The splining module can receive each of the first, second, third, and fourth pluralities of samples and generates, for each of the plurality of samples, a representation of the respective voltage signal using a splining technique. For each of the respective representations of the voltage signal using the splining technique, the peak detection module can determine a peak magnitude of the respective reflection of the respective laser beam, and determine a respective time-of-flight from emitting of the respective laser beam to the time of the respective peak magnitude. Each respective peak magnitude can be correlated to an intensity of the respective reflected beam off of the respective object. Each time-of-flight can be converted to a distance from the LIDAR device to the respective object. The same configuration can be further extended to a multiplexer that is a time-division 8×1 multiplexer. The functionality and configuration can be implemented for an additional fifth, sixth, seventh, and eighth laser emitter, sensor, and convertor device.

In a third embodiment, an autonomous driving vehicle (ADV) can include a LIDAR device having any of the above configurations and functionality.

In a fourth embodiment, a computer-implemented method, practiced on a LIDAR device having a laser emitter, a sensor, a converter device, an analog-to-digital converter (ADC), a splining module, a peak detector module, and a processing module coupled to the ADC, splining module, and peak detector module. The method can include emitting an initial laser beam by the laser emitter, detecting by the sensor a reflection of the initial laser beam, converting, by the converter device, an output of the sensor from a current to a first voltage signal representing the reflection of the initial laser beam, and measuring, by the ADC, a first plurality of sample points from the first voltage signal. The method can further include generating, by the splining module, a representation of the first voltage signal using the first plurality of sample points. The peak detection module can determine a peak magnitude of the first voltage signal using the representation of the first voltage signal. The peak detection module can also determine a time at which the peak magnitude of the reflection of the initial laser beam occurred. The processing module can generate LIDAR information for the peak magnitude and a time-of-flight from emitting the initial laser beam to the time at which the peak magnitude of the reflection of the first laser beam occurred. An ADV can use the LIDAR information is utilized to navigate the ADV responsive to one or more obstacles detected by the LIDAR device. In an embodiment, the sensor can be an avalanche photodiode. In an embodiment, the converter device can be a transimpedance amplifier (TIA). The processing module can be further configured to correlate a peak magnitude of the representation of the first voltage signal to an intensity of the reflected initial laser beam as part of the LASER information.

In a fifth embodiment, any of the above method operations can be performed on a system that includes a memory programmed with executable instructions, the memory coupled to a processing system having at least one hardware processor, the method operations carried out when the instructions are executed by the processing system. A non-transitory computer-readable medium can store executable instructions that, when executed by a processing system having at least one hardware processor, perform any of the above method operations.

In a sixth embodiment, any of the above method operations can be performed on a system that includes a memory programmed with executable instructions, the memory coupled to a processing system having at least one hardware processor, the method operations carried out when the instructions are executed by the processing system. A non-transitory computer-readable medium can store executable instructions that, when executed by a processing system having at least one hardware processor, perform any of the above method operations.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of network such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous driving vehicle (ADV) 101 refers to a vehicle that can be configured to operate in an autonomous mode in which the vehicle navigates through an environment with little or no input from a driver. Such an autonomous driving vehicle can include a sensor system 115 having one or more sensors that are configured to detect information about the environment in which the ADV 101 operates. The ADV 101 and its associated controller(s) use the detected information to navigate through the environment. Autonomous driving vehicle 101 can operate in a manual mode, a full autonomous mode, or a partial autonomous mode. In a manual mode, the ADV 101 can be operated by a human driver with little, or no, assistance for logic onboard the autonomous vehicle. In full autonomous mode, the ADV 101 can be operated using little, or no, human driver assistance. In partial autonomous mode, ADV 101 can be operated with some or all driving logic subsystems active, and a human driver providing some driving control inputs.

In one embodiment, autonomous driving vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
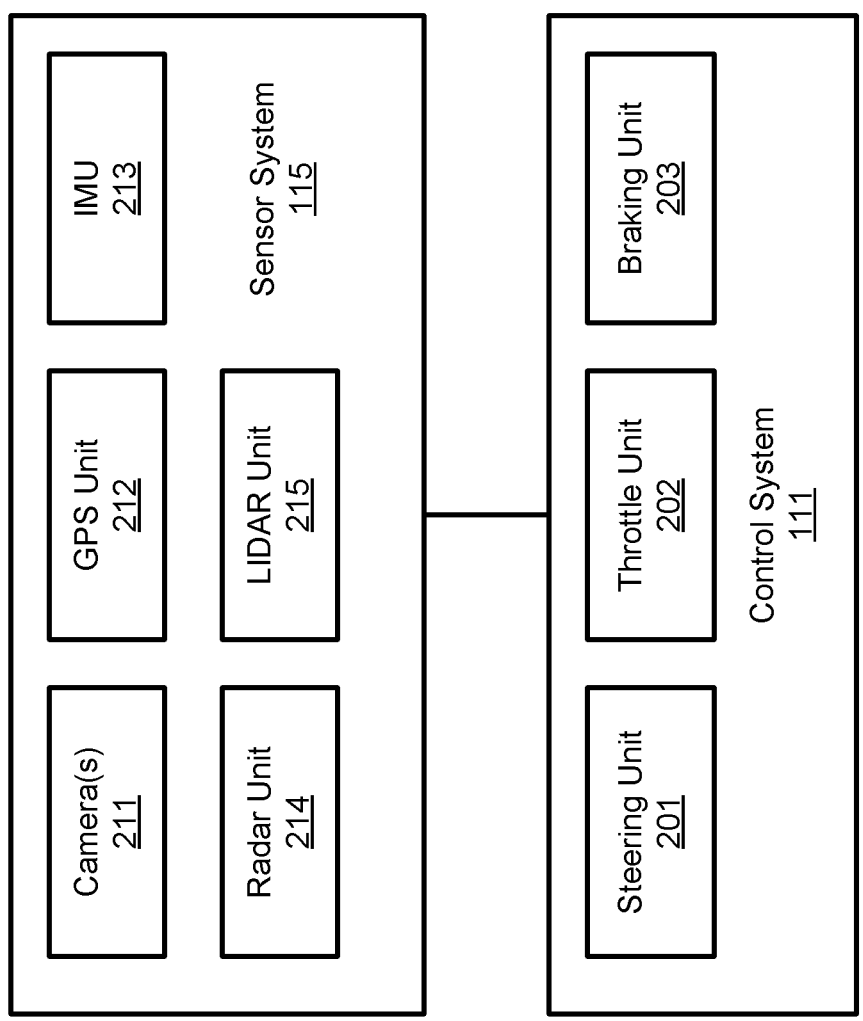
FIG. 2 is a block diagram illustrating an example of an autonomous driving vehicle (ADV) according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. LIDAR sensor 215 can include a plurality of sensor types to perform the task of detecting a peak magnitude of a reflected laser beam, reflected off of an object surrounding the autonomous vehicle, and a time at which the peak magnitude of the reflected laser beam occurred. In an embodiment, a sensor can receive a reflection of a laser beam, reflected off of an object, and generate a current signal that is passed to a transimpedance amplifier (TIA). The TIA converts the received current signal into a voltage signal. An analog-to-digital convertor (ADC) can sample the voltage signal into a plurality of samples. The number of samples taken from the received voltage signal can be substantially lower than in the prior art. A splining module uses a splining algorithm, such as a cubic splining algorithm, to generate a representation of the voltage signal. The representation of the voltage signal can be used to determine a peak magnitude of the received reflected laser beam and a time-of-flight from emitting the laser beam to the time that the peak magnitude of the reflected laser beam occurred. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

Sensor system 115 can detect obstacles to a path of an ADV. Such obstacles can be taken into account by a least cost path module that emulates human driving behavior.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc. Data collector 121 may further receive LIDAR information from a LIDAR device in the sensor system 115 of the autonomous vehicle control system. LIDAR information may be transmitted to server 103 to update a high-definition (HD) map of objects surrounding the autonomous vehicle.

In an embodiment, data collector 121 can record data comprising driving statistics 123 for an initial path for a portion of an ADV route, and a selected least cost path for the portion of the route. And initial path can be, for example, a path that follows a centerline of a lane of roadway. Driving statistics 123 can also include sensor data and control input data associated with the ADV while it drives along a cost path along the route. Driving statistics 123 a path along the route can include speed, heading, steering input, braking input, if any, and sensor data including lateral forces, acceleration, and braking forces, and the like, such as may affect passenger comfort as the ADV drives along a path. Machine learning engine 122 can use driving statistics 123 to generate algorithms and models 124 that can be used to upgrade ADV driving logic.

Algorithms 124 can then be uploaded on ADVs to be utilized during autonomous driving in real-time. In an embodiment, ADVs 101 can upload driving statistic data to server(s) 103 to facilitate crowd-sourced learning of algorithms and models 124 that can be downloaded to an ADV. For example, machine learning 122 can determine speed vs. steering input relationships that affect passenger comfort, wherein the speed and steering input are both within acceptable limits, but passenger comfort detected by IMUs or roll-pitch indicate levels that affect passenger comfort.

Figure 3:
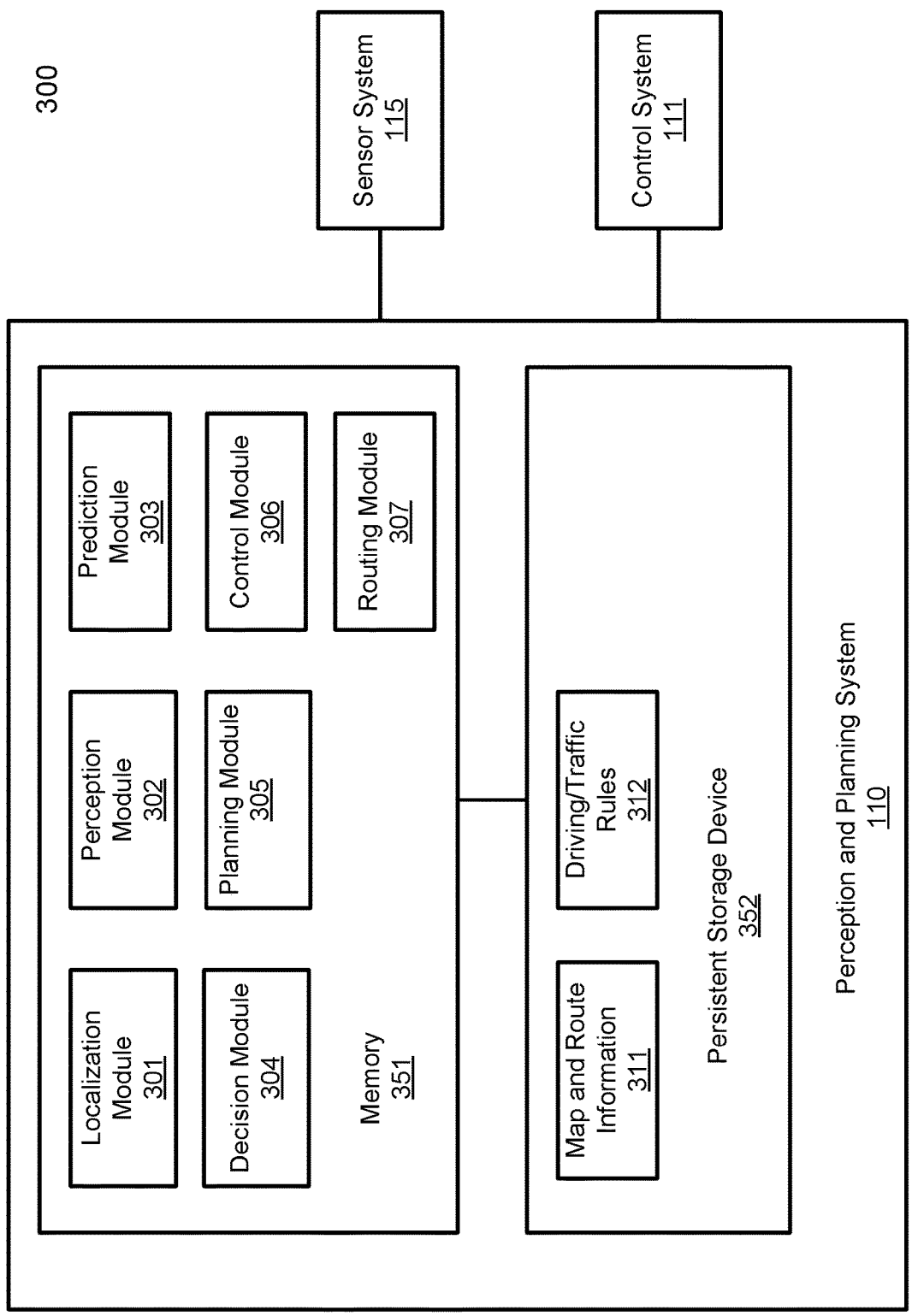
FIG. 3 is a block diagram illustrating an example of a perception and planning system used with an ADV according to one embodiment

FIG. 3 is a block diagram illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR. A LIDAR device can include a LIDAR peak detector that utilizes a splining algorithm and a low sampling rate of an ADC than the ADCs used in the prior art, to reduce cost and increase efficiency of a LIDAR system. A LIDAR system can alternatively include a plurality of LIDAR scanners whose reflected laser beams are captured by a plurality of sensors and multiplexed for processing by a single high-sample rate ADC, as described further below.

For each of the objects scanned by the LIDAR device, prediction module 303 predicts how the object will behave under the circumstances. The prediction is performed based on the perception data perceiving the driving environment at the point in time in view of a set of map/route information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Figure 4A:
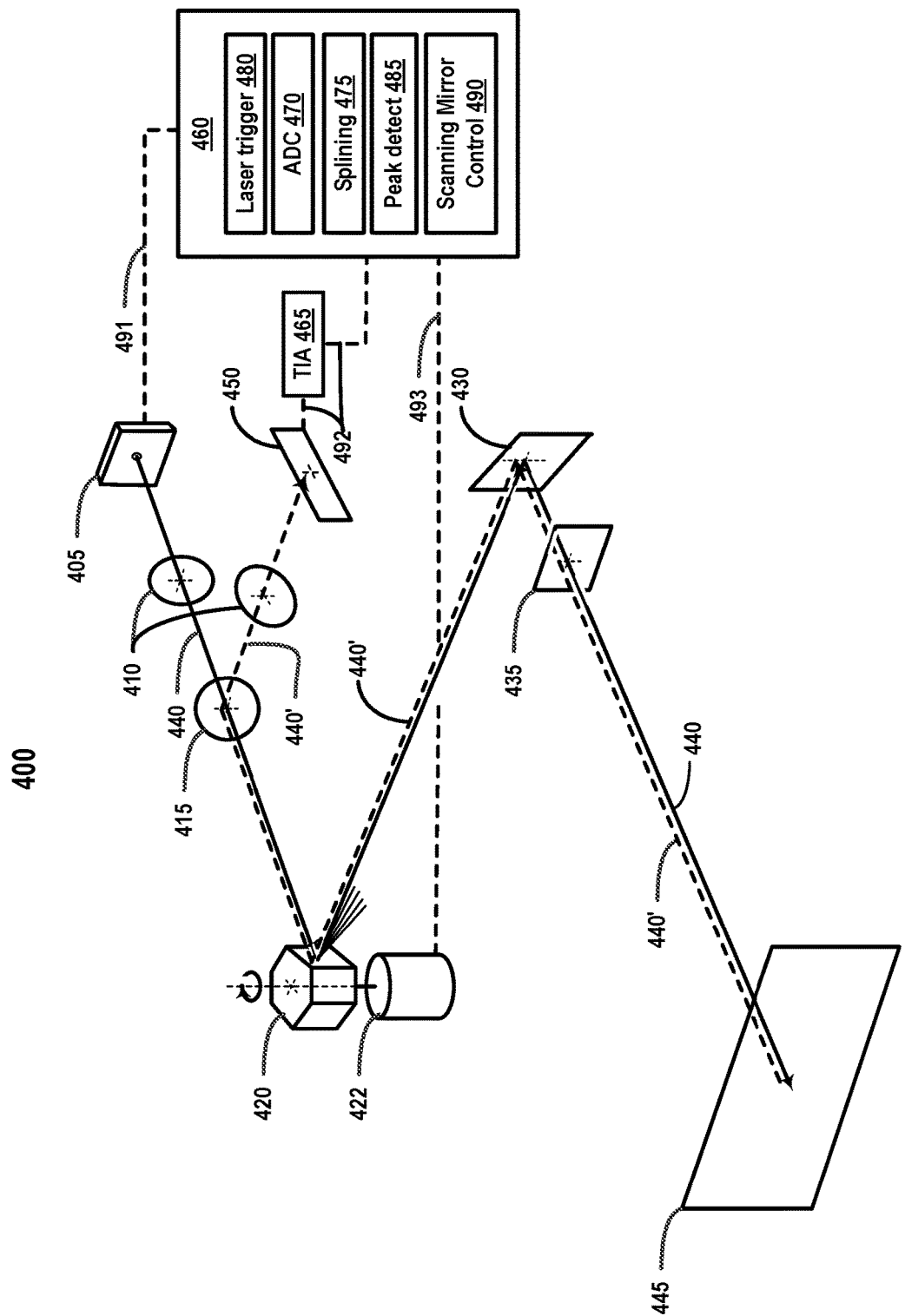
FIGS. 4A and 4B are block diagrams illustrating a LIDAR sensor system that incorporates peak detection using splining, for use with a LIDAR system in an ADV, according to one embodiment.
Figure 4B:
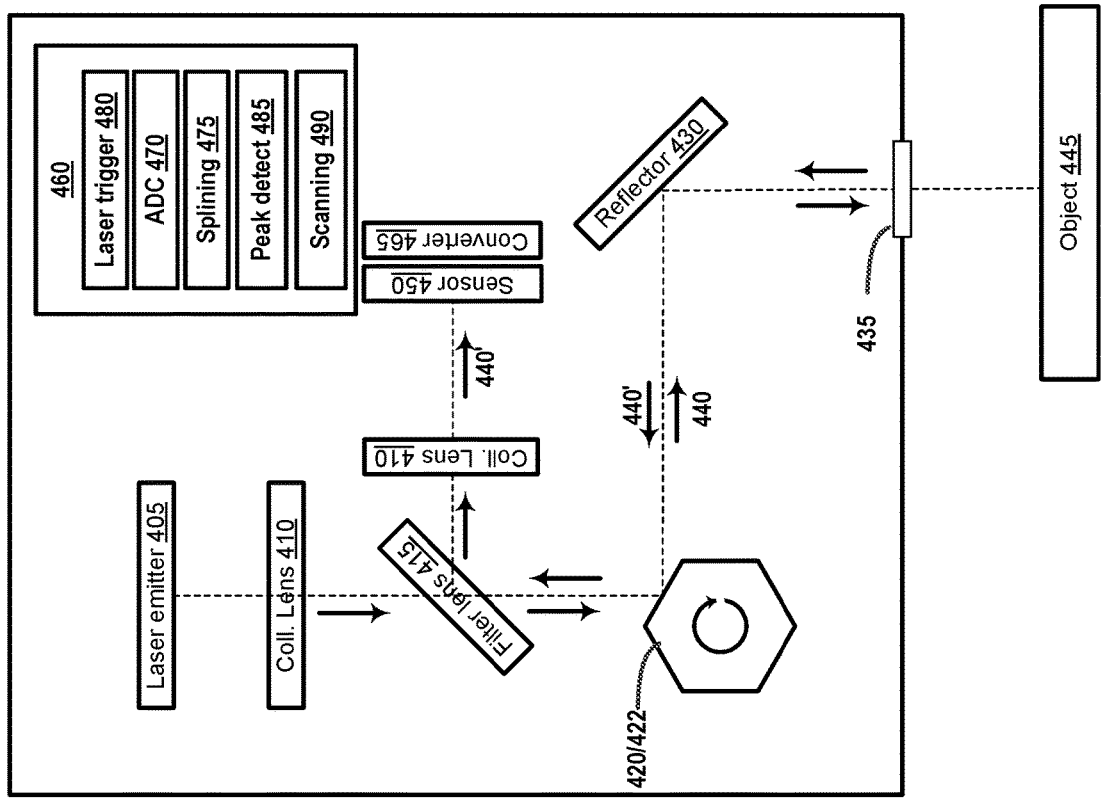

Referring now to FIGS. 4A and 4B, in an embodiment, a LIDAR sensor system 215 can include LIDAR device 400. In an embodiment, LIDAR device 400 can include laser emitter 405, a sensor (PIN Diode, APD, SPAD) 450, a converter 465, and an analog-to-digital converter (ADC) 470 that uses a lower sampling rate than LIDAR systems of the prior art. For example, the ADC 470 in FIG. 4A can sample at 250 to 500 mega-samples per second (250 Ms/s to 500 Ms/s), whereas prior art systems use expensive high-sample rate ADCs of 1.0 to 3.0 giga-samples per second (1.0 to 3.0 Gs/s). ADC 470 can use a lower sampling rate than in the prior art, because the splining module 475 will interpolate intermediate points from the lower sampling rate. The computational complexity required for interpolating points between samples using splining is less than the computational complexity and the burden of high-speed data interface between the ADC and controller of processing billions of sample points to determine a peak magnitude of a reflected laser beam off of an object. A controller 460 can include a laser trigger module 480, a splining module 475, a peak detection module 485, and a scanning mirror control module 490. Converter 465 can be a transimpedance amplifier (TIA).

FIG. 4A illustrates an example optical path that incorporates the laser emitter 405, sensor 450, converter 465, ADC 470, and a controller 460. FIG. 4B illustrate a top view of a layout of components corresponding to FIG. 4A. The components shown are by way of illustration. More, or fewer, components may be used to implement a peak detection system that uses splining and lower resolution than used in the prior art.

In an embodiment, laser emitter 405 emits an initial laser beam ("laser beam") 440. The laser beam 440 can pass through a collimating lens 410 to ensure that the laser beam 440 is substantially collimated. Next, the collimated laser beam 440 can pass through a filtering lens 415. In an embodiment, filtering lens 415 can be a 50% transmissive-50% reflective optic, such that 50% of the collimated laser beam 440 passes through filter lens 415 and 50% of the collimated laser beam 440 does not. When a scanned object 445 reflects the laser beam 440, the reflected laser beam 440' will eventually reach filter lens 415 and be reflected towards sensor 450, converter 465, and ADC 470.

Initially, emitted laser beam 440 passes through filtering optic 415 and is reflected by scanning mirror 420 toward reflector 430. Laser beam 440 reflects off of reflector 430 and exits the LIDAR device 400 via aperture 435. Laser beam 440 continues on to object 445. Object 445 reflects laser beam 440 (shown in FIG. 4A as a solid line) as reflected laser beam 440' (shown in FIG. 4A as a dashed line). Reflected laser beam 440' enters LIDAR device 400 via aperture 435 and is reflected by reflector 430 back toward scanning mirror 420. Scanning mirror 420 reflects reflected laser beam 440' to filter optic 415, which directs the reflected laser beam 440' to another collimating optic 410. The collimated reflected laser beam 440' is directed to sensor 450, converter 465, and ADC 470.

In an embodiment, sensor 450 can be an avalanche photodiode (APD) that generates a current signal representative of an intensity of reflected laser beam 440'. Sensor 450 will be always on. Converter 465 can convert the current signal output by sensor 450 to a voltage signal. In an embodiment, converter 465 can be a transimpedance amplifier. ADC 470 can generate a plurality of samples of the voltage signal at, e.g. 250-500 Ms/s. At time at which ADC 470 begins sampling can be a time $t_0$, which may usually be the laser trigger time, and a time at which the ADC 470 stops sampling can be a time $t_n$, which can be determined by a maximum distance that the LIDAR device is to measure. Typically this time is about 1 µs, corresponding to about 150 meters, and is configurable. When the ADC 470 starts sampling the voltage signal that is output by converter 465, peak detection module 485 can receive and store the plurality of samples of ADC 470 between time $t_0$ and time $t_n$. ADC 470 can stop sampling the voltage signal when $t_n$ is reached, which is configurable and determined by the maximum distance we want to measure. In an embodiment, peak detection module 485 can signal ADC 470 to stop sampling the voltage output from converter 465 when the value of one or more of the plurality of samples below a minimum value. In an embodiment, peak detection module 485 can assume that a pulse shape of the voltage signal received from converter 465 is substantially symmetrical (Gaussian shape).

Splining module 475 can receive, or access, the plurality of samples received from ADC 470 and stored by peak detection module 485. Splining module 475 can generate a representation of the voltage signal received by ADC 470 from converter 465 using a splining algorithm. In an embodiment, the splining algorithm can be a cubic spline algorithm. Peak detection module 485 can use the representation of the voltage signal, generated by the splining module 475, to determine a peak magnitude of the voltage signal received by ADC 470 from converter 465. In an embodiment, the splining algorithm can be a cubic splining algorithm. Peak detection module 485 can correlate the peak magnitude of the representation of the voltage signal with an intensity of the reflected laser beam 440' as received by sensor 450. Peak detection module 485 can determine a time-of-flight from the emitting of laser beam 440 to the time at which the peak magnitude of the reflected laser beam 440' occurred, $t_{peak}$.

Controller 460 can include a processing module that coordinates laser trigger 480 and peak detection module 485 to determine, for each emitted laser beam 440, detection of a peak magnitude of the reflected laser beam 440' detected by sensor 450 and processed by converter 465, ADC 470, peak detection module 485, and splining module 475. Scanning mirror control module 490 can control, via communication line 493, scanning mirror motor 422 to effect a rotation of scanning mirror 420 such that emitted lasers beams 440 reflect off of scanning mirror 420 as scanning lines in a plane. A processing module of controller 460, laser trigger module 480, and peak detect module 485 can also determine a time-of-flight from when the laser beam 440 is emitted, $t_{emit}$, to the time, $t_{peak}$, at which the peak magnitude of the reflected laser beam 440' occurred. Processing module of controller 460 and laser trigger module 480 can send a signal to emit a next laser beam via communication line 491. Peak detection module 485 can receive trigger information indicating a rising edge of a received light pulse of reflected laser beam 440' from sensor 450, converter 465, and/or ADC 470. Processing module of controller 460 can correlate the time-of-flight to a distance of the object 445 from the LIDAR device 400. Controller 460 can also correlate the distance of the object 445 from the LIDAR device 400 with the peak magnitude to determine properties of the object 445. LIDAR information can include at least the distance to the object 445 and the properties of the object 445. LIDAR information is passed to the perception and planning system 110 to determine one or more objects surrounding the ADV, for purposes of navigating the ADV.

Controller 460 can include a processor, memory, storage, one or more communication interfaces, a display, one or more input devices, one or more input/output (I/O) channels, one or more analog-to-digital convertor channels, one or more timer channels, an interrupt controller, and other components of a computing system. The processor may include one or more hardware processors which may include a central processing unit, a graphics processing unit, mathematical co-processor, or pipelined processor. Executable instructions may be stored on one or more non-transitory non-volatile storage devices. Communications interfaces can include WiFi, Ethernet, I$^2$C, USB, RS485, etc. Memory can be read-only memory (ROM), random access memory (RAM), flash memory, static memory, and the like.

Controller 460 can include one or more input device(s) such as a mouse, a touch pad, a touch sensitive screen (which may be integrated with display device, a pointer device such as a stylus, and/or a keyboard (e.g., physical keyboard or a virtual keyboard displayed as part of a touch sensitive screen). For example, input device may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Input/Output (I/O) devices may include an audio device. An audio device may include a speaker and/or a microphone to facilitate voice-enabled functions, such as voice recognition, voice replication, digital recording, and/or telephony functions. Other I/O devices may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. I/O devices may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect via a sensor hub (not shown), while other devices such as a keyboard or thermal sensor may be controlled by an embedded controller (not shown), dependent upon the specific configuration or design of system.

Computer-readable storage medium may be used to store some software functionalities described above persistently. While computer-readable storage medium is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Note that some or all of the components as shown and described above may be implemented in software, hardware, or a combination thereof. For example, such components can be implemented as software installed and stored in a persistent storage device, which can be loaded and executed in a memory by a processor to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 5:
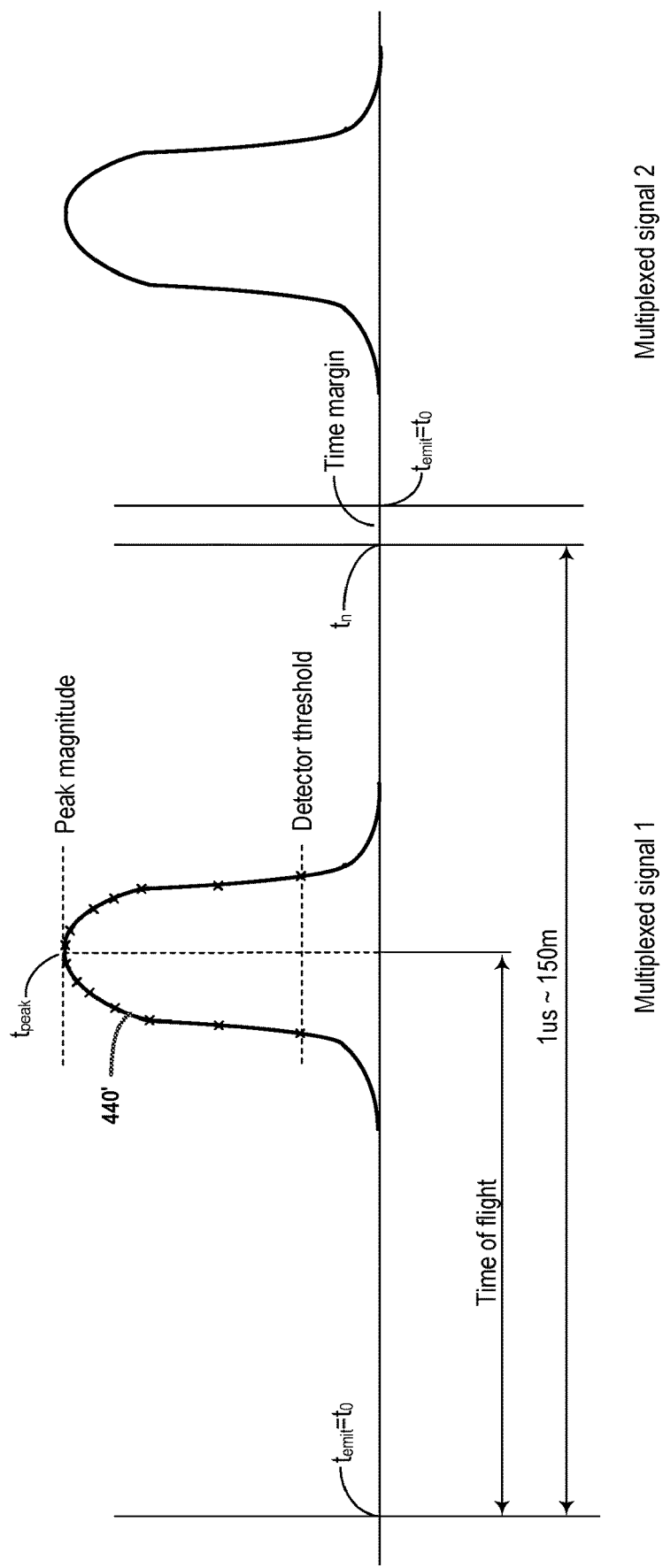
FIG. 5 illustrates an example reflected pulse of a laser beam, reflected off of an object scanned by a LIDAR system of an ADV, with peak detection using splining, according to one embodiment. (remove detector threshold)

FIG. 5 illustrates, in block diagram form, detection of a peak magnitude and time-of-flight, from the time, $t_{emit}=t_0$, that a laser beam 440 was emitted to the time at which the peak magnitude of a reflection of the laser beam 440' off of an object 445 occurred. A time slot is allocated for each emitted laser beam 440 in a plurality of laser beams 440 emitted to scan a target object 445. The time slot can be 1 microsecond (1 μs), or other configurable time. The laser beam 440 is reflected off of the object 445, back toward the LIDAR device 400. Reflected laser beam 440' is received by sensor 450. Sensor 450 outputs an analog current signal to a converter 465, such as a transimpedance amplifier (TIA). Converter 465 outputs a voltage signal representing the current signal received from sensor 450. Converter 465 outputs the voltage signal to ADC 470. ADC 470 begins to sample for reflected pulse 440' at $t_{emit}=t_0$. Peak detection module 485 can receive and store samples from ADC 470. Sampling can end at a configurable time $t_n$. Alternatively, sampling can end when converter 465 stops outputting a voltage signal to ADC 470. In another embodiment, sampling can end when samples received and stored by peak detection module 485 fall below a minimum value, such as a value of one or more samples taken when sampling began at time $t_0$.

When sampling by ADC 470 ends at time $t_n$, splining module 475 can read, or access, the plurality of ADC 470 samples stored by detection module 485. Splining module 475 can generate a representation of the analog voltage signal received by, and sampled by, ADC 470. FIG. 5 illustrates an example pulse of light of a reflected laser beam 440' as received by sensor 450, and the current pulse received by converter 465, and the voltage pulse received by ADC 470. The small X's on the light pulse shape illustrated in FIG. 5 of reflected laser beam 440' indicate sample points by the ADC 470. A representation of pulse shape of the reflected laser beam 440' received at sensor 450 is created by the splining module 475 using the plurality of samples received from ADC 470 and stored by peak detection module 485. Peak detection module 485 can utilize the representation of the sampled analog voltage signal to determine a peak magnitude of the intensity of the reflected laser beam 440' using the plurality of samples received from ADC 470.

The time-of-flight from the emitted laser pulse 440, $t_{emit}$, to the time, $t_{peak}$, at which the peak magnitude of the reflected laser beam 440' occurred can be used to determine a distance from the LIDAR device 440 to the scanned object 445. The determined peak magnitude of the reflected laser beam 440' can be correlated to an intensity that represents features or attributes of the scanned object 445. The peak magnitude, correlated intensity, time-of-flight, properties of the object 445 scanned, and distance to the object scanned comprise LIDAR information that can be passed to the perception and planning system 110 of the ADV. The perception and planning system 110 can use the LIDAR information to determine one or more objects surrounding the ADV and can navigate the ADV with respect to the determined one or more objects.

Figure 6:
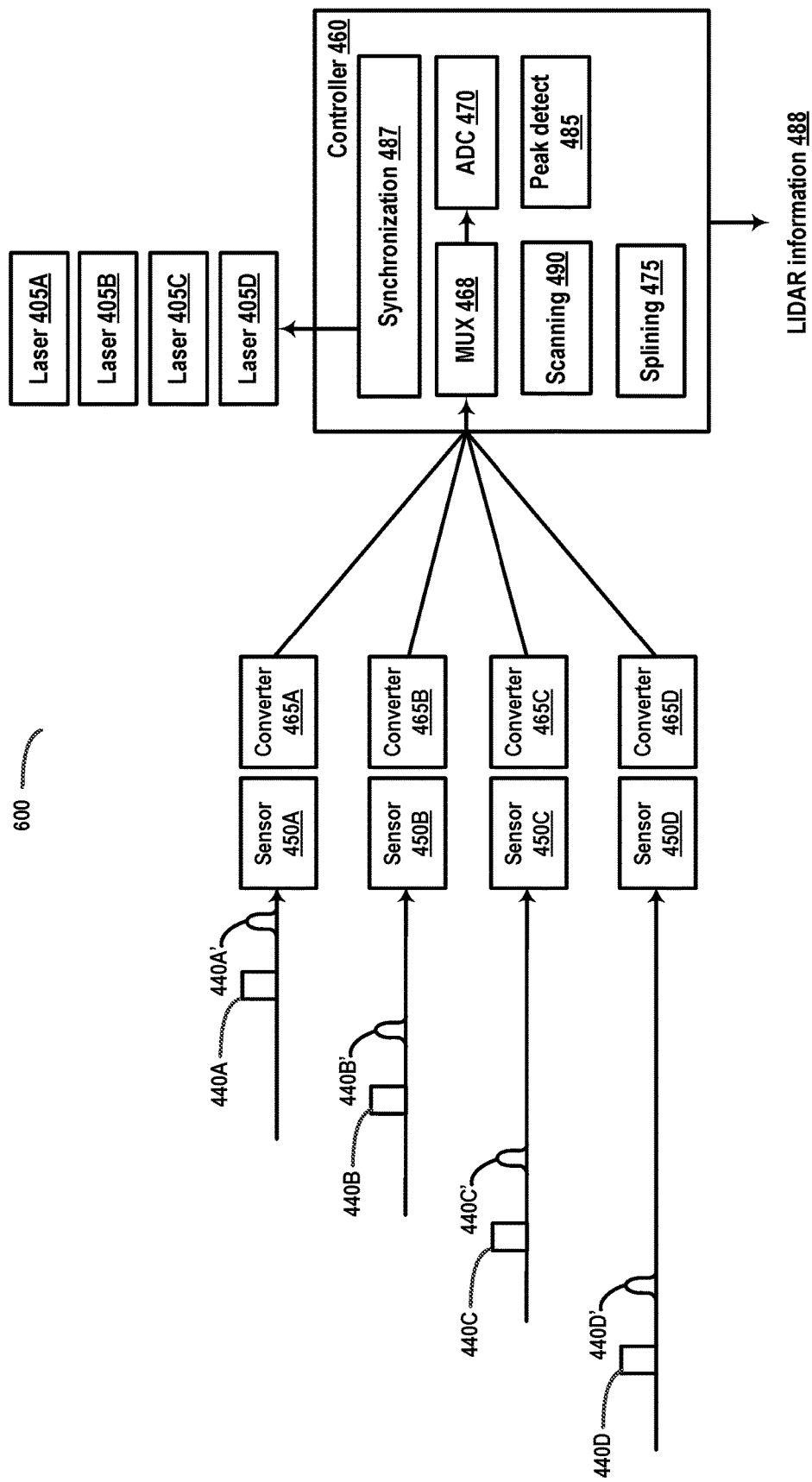
FIG. 6 illustrates a system comprising multiple LIDAR scanning devices and a single analog-to-digital converter with peak detection using splining, for use in an ADV, according to some embodiments.

FIG. 6 illustrates a system 600 comprising multiple LIDAR scanning devices and a single analog-to-digital converter (ADC) with peak detection using splining, for use in an ADV, according to some embodiments. Each of the multiple LIDAR devices of system 600 can be as described with reference to FIGS. 4A and 4B, above, with exceptions as described below. In FIG. 6, a system 600 having four LIDAR scanning devices, e.g. LIDAR systems 400A-400D, is described, using a single ADC 470, and time-division multiplexer 468. Components of LIDAR systems 400A-400D are shown grouped by operation, rather than grouped by each LIDAR system. In the system 600, controller 460 can further include: synchronization module 487 and time-division multiplexer 468.

Synchronization module 487 synchronizes: the timing of emitting a laser beam 440A-440D from each respective laser 405A-405D; the operation of the multiplexer 468; the operations of scanning motor control 490 for each scanning mirror 420A-420D by motors 422A-422D, and other functionality. In an embodiment having four LIDAR scanning devices 400, ADC 470 can have a sampling rate of, e.g., 1.0 Gs/s to 1.5 Gs/s. Multiplexer 468 can be a 4×1 time-division multiplexer 468. In an embodiment having eight LIDAR scanning devices (not shown), ADC 470 can have similar sampling rate as in previous configuration. Multiplexer 468 can be an 8×1 time-division multiplexer 468.

Each of the multiple LIDAR devices 400A-400D in LIDAR system 600 can be a system as described above with reference to FIGS. 4A and 4B, with the exception that the output of the multiple converters, e.g. converters 465A-465D, described here in FIG. 6 is multiplexed into a single signal by multiplexer 468. A sample timing diagram of emitting of each laser beam, multiplexing the multiple outputs of the converters 465A-465D, and processing by ADC 470 is described below with reference to FIG. 9. The single signal output from multiplexer 468 is sampled by a single ADC 470 in FIG. 6. The output of the single ADC 470 is a single concatenated stream of output samples from multiple ADC conversions. Synchronization module 487 cause the samples corresponding to each respective reflected laser beam 440A'-440D' to be stored such that the peak detection module 485 and splining module 475 can determine the peak magnitude of the intensity of respective reflected beams 440A'-440D', and the time at which each peak magnitude occurred relative to the respective emitting of laser beam 440A-440D by laser emitters 405A-405D.

Controller 460 can include any, or all, or the hardware components for controller 460 described above with respect to FIGS. 4A and 4B. Controller 460 can further include synchronization module 487, splining module 475, peak detection module 485, and scanning control module 490. Splining module 475, peak detection module 485, and scanning control module 490 can perform the functions described above with reference to FIGS. 4A and 4B, and the functions of these modules can be further extended, as described below, to perform their respective functionalities on a sequence of received reflected light beams 440' as described below.

Each of lasers 405A through 405D can receive a signal from synchronization module 487 to emit a laser beam 440A-440D, respectively, in sequence. The synchronization module 487 can also output a signal to time division multiplexer 468 to utilize the trigger sequence to lasers 405A-405D to sequence multiplexing operations as described below. Sensors 450A-450D can each receive a respective reflected laser pulse 440A'-440D'. Sensors 450A-450D can each reach their respective trigger threshold and begin emitting a current signal to converters respective converters 465A-465D. Converters 465A-465D can output a respective voltage signal to multiplexer 468. Multiplexer 468 can buffer and sequence the voltage signals received from converters 465A-465D and transmit the multiplex voltage signals as a signal stream to ADC 470. Synchronization module 487 can further control positioning of scanning mirrors 420A-420D and motors 422A-422D in accordance with a sequenced operation such that laser emitter, e.g., 405A, emits a laser beam 440A and 1 microsecond (1 µs) is allowed for maximum time-of-flight to sensor 450A. An additional 1 µs can be allocated for sensor, e.g. 450A to output a current signal responsive to receiving reflected laser beam 440A' and for converter 465A to receive the current signal from sensor 450A and to output a voltage signal to multiplexer 468. A further 1 µs can be allocated to store the plurality of samples in association with LIDAR system 400A, and to determine a peak magnitude, and time at which the peak magnitude occurred, of the reflected laser beam 440A'. Another 1 µs can be allocated to reposition the scanning mirror 420A, and the process can repeat in sequence for each LIDAR system 400B-400D. Thus, each LIDAR system, e.g. 400A, in multiple LIDAR system 600, can have an operational cycle for each emitted laser beam 440 of approximately 5 µs. In an embodiment, one or more of the sequence of operations for a first LIDAR system, e.g. 400A can be performed in parallel with one or more other LIDAR systems 400B-400D. In an embodiment, rather than using four laser emitters, 405A-405D, a single laser emitter 405, capable of emitting laser beams at a pulse rate of, e.g., 200 KHz, can be used to emit the above-described laser beams 440A-440D. In such an embodiment, additional optics would be added to route the emitted laser beams 440A-440D to the intended object(s) to be scanned.

For each emitted laser beam 440A-440D, a reflected laser beam 440A'-440D' is reflected off of an object 445A-445D (not shown). In an embodiment, laser beams 440A-440D may be positioned to reflect off of a single object 445, to more quickly scan the object 445. A peak magnitude of the reflected beam 440A'-440D' is determined, and a time-of-flight at which the respective peak magnitude occurred is determined. Each time-of-flight can be correlated to a distance at which the applicable respective object is located, away from the respective LIDAR system 400A-400D. Each peak magnitude can respectively be correlated to an attribute of the respective object 445A-445D. For each reflected beam 440A'-440D' the peak magnitude can be correlated to an intensity, and the peak magnitude, intensity, and time-of-flight can comprise LIDAR information which is transmitted to a perception and planning system 110 of an ADV and used to determine one or more objects surrounding the ADC so that perception and planning system 110 can navigate the ADV with reference to the one or more objects.

Although the above system 600 is described with respect to four LIDAR systems 400A-400D, the principles described herein can be applied to any number of LIDAR systems. In an embodiment, LIDAR system 600 can comprise eight LIDAR systems 400A-400H (not shown) using a single ADC 470 with similar sampling rate, and an 8×1 multiplexer 468.

Figure 7:
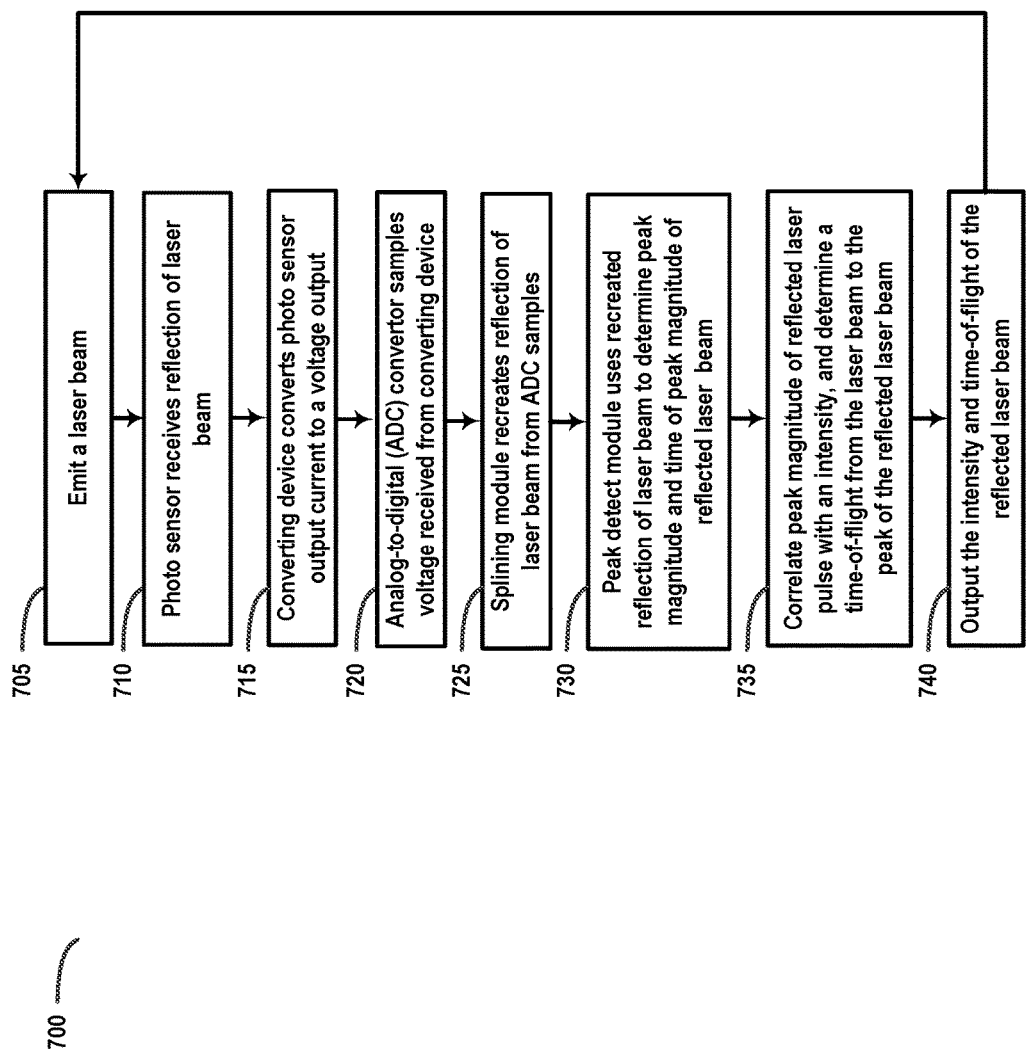
FIG. 7 illustrates a method of peak detection in a LIDAR system using splining, for use in a LIDAR device in an ADV, according to some embodiments.

FIG. 7 illustrates a method 700 of peak detection in a LIDAR device that detects peaks using an inexpensive, low-sample rate analog-to-digital converter (ADC) and a splining module, for use in a LIDAR system in an ADV, according to some embodiments.

In operation 705, a laser emitter 405 can emit a laser beam 440 to be directed to an object to be scanned, e.g. object 445 of FIGS. 4A and 4B.

In operation 710, a photo sensor, e.g. sensor 450, receives a reflection 440' of laser beam 440, reflected off of object 445. When sensor 450 receives a sufficient amount of light to meet a preconfigured threshold, sensor 450 begins outputting a current signal representing an intensity of reflected laser beam 440'.

In operation 715, converter 465 receives the current signal that is output by sensor 450 and begins converting the current signal to a voltage signal. Converter 465 outputs the voltage signal to an analog-to-digital (ADC) converter, e.g. ADC 470.

In operation 720, ADC 470 receives the voltage signal from converter 465 and samples the voltage signal to generate a plurality of samples representing the voltage signal.

In operation 725, peak detection module 485 receives, from ADC 470, the plurality of samples of the voltage signal and stores the plurality of samples. Splining module 475 uses the plurality of samples of the voltage signal to generate a representation of the voltage signal, generated using a splining algorithm. In an embodiment, the splining algorithm is a cubic splining algorithm.

In operation 730, peak detection module 485 uses the representation of the voltage signal, generated by the splining module 475, to determine a peak magnitude of the voltage signal that represent a peak intensity of the reflected laser beam 440'. Peak detection module 485 also determines a time, $t_{peak}$, that the peak magnitude occurred, relative to the time, $t_{emit}$, at which the laser beam 440 was emitted by laser emitter 405. In an embodiment, a pulse shape of the representation of the voltage signal is assumed to be symmetric (Gaussian).

In operation 735, peak detection module 485 can correlate the peak magnitude of the reflected laser beam 440' to an intensity which represents one or more attributes of the object 445 being scanned by laser beam 440. Peak detection module 485 can also determine a time-of-flight from when the laser beam 440 was emitted, to the time at which the peak magnitude of the reflected laser beam 440' occurred. Peak detection module 485 can determine, from the time-of-flight, a distance of object 445 away from LIDAR system 400.

In operation 740, LIDAR system 400 can transmit LIDAR information, include the peak magnitude, time-of-flight, distance to the object, and intensity information to a perception and planning system 110 of an ADV, for use by the ADV is navigating the ADV.

Figure 8:
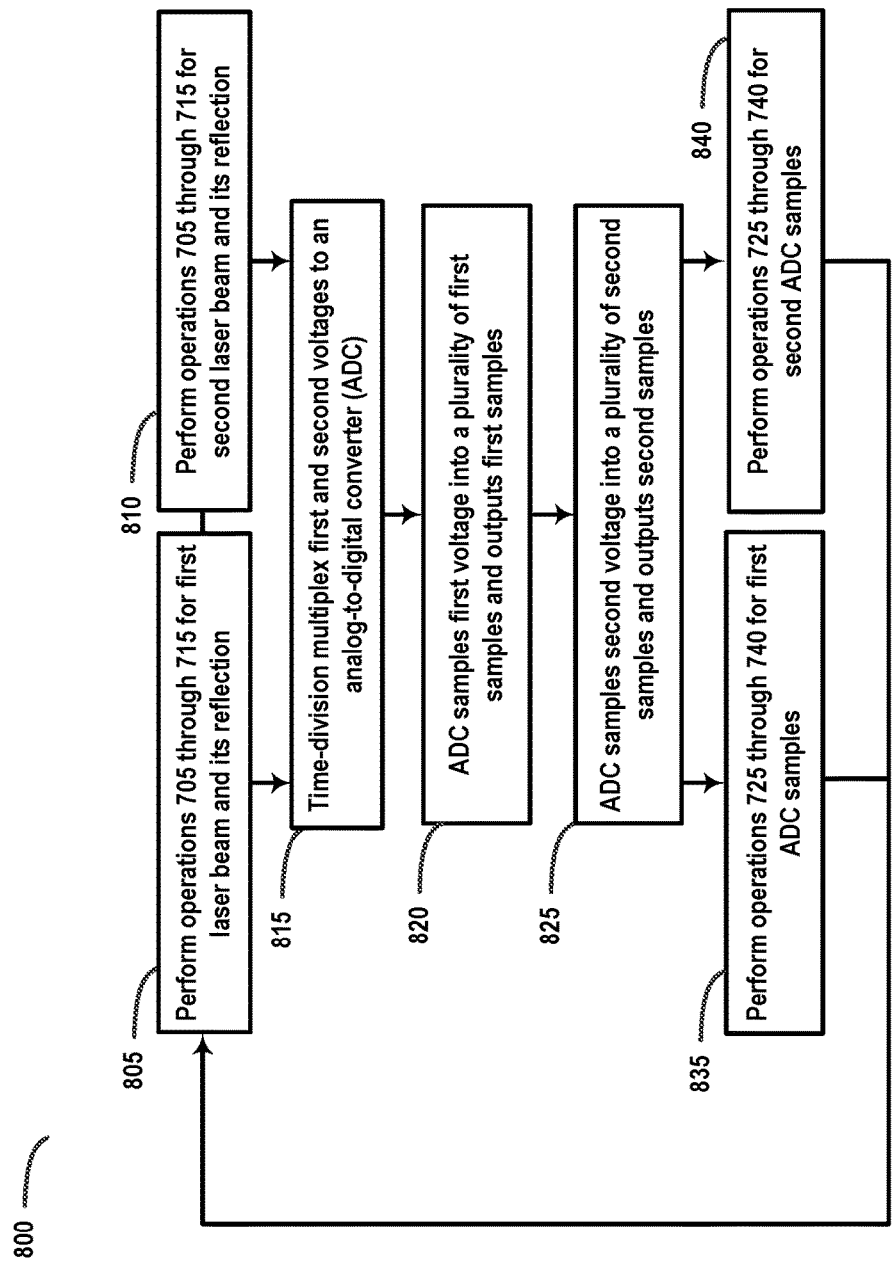
FIG. 8 illustrates a method of peak detection in a LIDAR system having a plurality of LIDAR scanning devices using splining and a single analog-to-digital converter, for use in an ADV, according to some embodiments.

FIG. 8 illustrates a method 800 of peak detection in a LIDAR system 600 having a plurality of LIDAR scanning devices 400 using a splining algorithm and a single analog-to-digital converter, for use in an ADV, according to some embodiments. A LIDAR system 600 having multiple LIDAR devices 400 is described above with reference to FIG. 6. The LIDAR system 600 of FIG. 6 is described with reference to four LIDAR devices 400. For simplicity, method 800 is described with reference to a LIDAR system 600 comprising multiple LIDAR devices, having just two LIDAR devices, 400A and 400B, rather than the four laser devices 400A-400D described with reference to FIG. 6, above. Method 800 is further described with reference to one or more method operations of method 700, described above with reference to FIG. 7. The inventive concepts described in method 800 are extendible to a LIDAR system having any number of LIDAR devices.

In operation 805, a first LIDAR device, e.g. 400A, of a multi-device LIDAR system 600 having two LIDAR devices, performs method operations 705 through 715, as described above in method 700, with reference to FIG. 7. Method operations 705 through 715 include emitting a laser beam 440, a sensor 450 receiving a reflection 440' of the laser beam 440 off of an object 445, the sensor 450 outputting a current signal representing an intensity of the reflected laser beam 440', and a converter 465 receiving the current signal from sensor 450 and converting the current signal to a voltage signal.

In operation 810, a second LIDAR device, e.g. 400B, of a LIDAR system 600 having two LIDAR devices, performs operations 705 through 715 of method 700.

In operation 815, a time-division multiplexer, e.g. MUX 468, receives the first voltage signal output from the converter 465A and the second voltage signal output from the converter 465B, and multiplexes the first and second voltage signals into a single signal. Multiplexed single signal is output to the ADC. In a two LIDAR device 400 LIDAR system 600, the sampling rate of the ADC can be as low as 250 (Ms/s) to 500 Ms/s.

In operation 820, ADC 470 samples the first voltage signal into a first plurality of samples and send to peak detect module.

In operation 825, ADC 470 samples the second voltage signal into a second plurality of samples and send to peak detect module.

In operation 835, peak detection module 485 and splining module 475 can perform operations 725 through 740 of method 700 on the first plurality of ADC samples. Operations 725 through 740 of method 700 are described above with reference to FIG. 7. The operations include: the splining module 475 creating a representation of the voltage signal generated by first sensor 465A of the first LIDAR device; detecting a peak magnitude of the reflected laser pulse 440A' and a time at which the peak magnitude occurred relative to emitting the laser beam 440A; correlating the peak magnitude to an intensity; determining a distance of the scanned object 445A (or just a single object 445, in an embodiment for multiple LIDAR devices scanning different parts of the same object 445) from the LIDAR device 400A of LIDAR system 600; and outputting to the perception and planning system 110 of the ADV LIDAR information including the peak magnitude, intensity, time-of-flight, and/or distance of the object from the LIDAR device.

In operation 840, peak detection module 485 and splining module 475 can perform operations 725 through 740 of method 700 on the second plurality of ADC samples with respect to second sensor 465B, reflected laser pulse 440B', and object 445B (or just single objet 445, in an embodiment for multiple LIDAR devices scanning different part of the same object 445).

Method 800 continues at operation 805, above.

Figure 9:
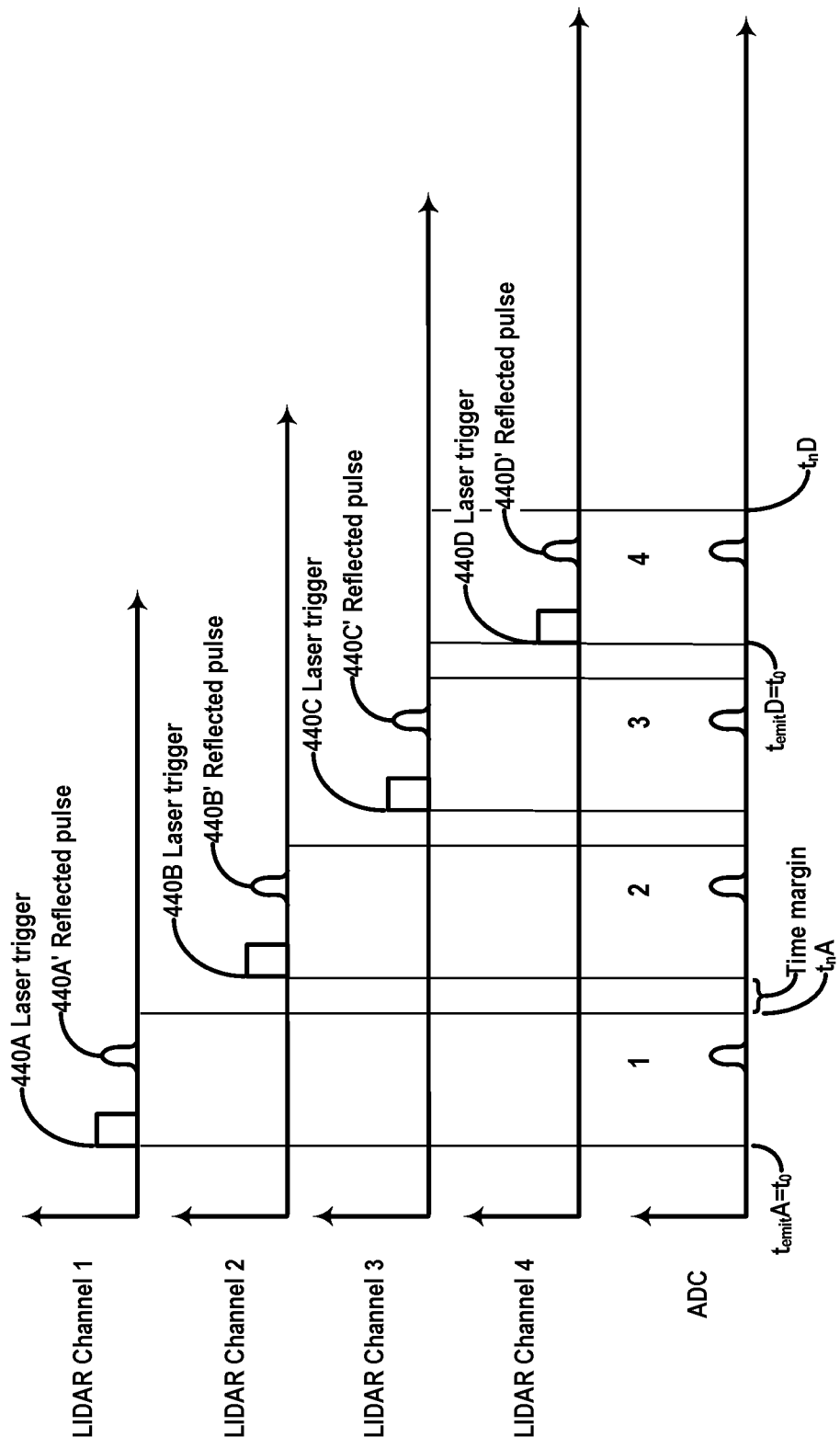
FIG. 9 illustrates a timing diagram for emitting and processing multiple laser beams and their respective reflected pulses, multiplexed to a single analog to digital converter, according to one embodiment.

FIG. 9 illustrates a timing diagram for emitting and processing multiple laser beams and their respective reflected pulses, multiplexed to a single analog-to-digital converter ADC 470, according to one embodiment. The multiple LIDAR channels include LIDAR Channel 1, 2, 3, and 4. Each LIDAR channel, e.g. LIDAR channel 1, emits a laser beam 440 at a time $t_{emit}=t_0$. For example, LIDAR channel 1 emits a laser beam 440A and receives a reflection 440A' of the emitted laser beam 440A off of a target object. For a time starting at to through a time $t_n$, the multiplexor 468 will time-division multiplex any output received from the sensor 450 associated with LIDAR channel 1 and converted to a voltage by the converter associated with LIDAR channel 1, to a time-division slot associated with LIDAR channel 1. ADC 470 will sample any signal received during the time slot for LIDAR channel 1 and output the samples to peak detection module 485 for processing as described above. At the end of time $t_n$, a small time margin is allotted for multiplexor switching to a next channel. Each of LIDAR channels 1 through 4 can be similarly processed in a sequential manner. The timing diagram illustrates an axis labeled "ADC," indicating the reflected pulse 440x' of the emitted laser beam 440x, where x={A, B, C, D} as seen by the single ADC 470.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A LIDAR device for use in an autonomous driving vehicle (ADV), comprising:
   a controller comprising a processor, memory, storage, one or more communication interfaces, one or more analog to digital convertors (ADCs), and one or more timers, the memory comprising executable instructions that, when executed by the processor, configure the controller to implement a splining module, a peak detection module, and a processing module;
   a first laser emitter, coupled to a first timer of the one or more timers, to emit a first laser beam;
   a first sensor that detects a reflection of the first laser beam;
   a first converter device that converts an output of the first sensor from a current to a first voltage signal representing the reflection of the first laser beam, the first converter communicatively coupled to the first sensor and the controller;
   a first analog-to-digital converter (ADC) of the one or more ADCs of the controller configured to measure a first plurality of sample points from the first voltage signal;
   the splining module configured to generate a representation of the first voltage signal using the first plurality of sample points;
   the peak detection module configured to determine a peak magnitude of the first voltage signal using the representation of the first voltage signal, and to determine a time at which the peak magnitude of the reflection of the first laser beam occurred;
   the processing module coupled to the ADC, the splining module, and the peak detection module, the processing module configured to generate LIDAR information from the peak magnitude and a time-of-flight from emitting the first laser beam to the time at which the peak magnitude of the reflection of the first laser beam occurred, wherein the LIDAR information is utilized to navigate the ADV responsive to one or more obstacles detected by the LIDAR device.

2. The LIDAR device of claim 1, wherein the first sensor comprises an avalanche photodiode (APD).

3. The LIDAR device of claim 2, wherein the APD is always on.

4. The LIDAR device of claim 1, wherein the processing module is further configured to correlate the peak magnitude of the representation of the first voltage signal to an intensity of the reflected first laser beam.

5. The LIDAR device of claim 1, wherein the splining module is configured to assume that a pulse shape of the reflection of the first laser beam is substantially symmetric (Gaussian shape).

6. The LIDAR device of claim 1, wherein the peak magnitude of the reflected first laser beam is determined as a maximum value for the representation of the first voltage signal.

7. The LIDAR device of claim 1, wherein the first converter device comprises a transimpedance amplifier.

8. The LIDAR device of claim 1, wherein the ADC samples the first voltage signal at a rate between 250 mega-samples per second and 500 mega-samples per second.

9. The LIDAR device of claim 1, further comprising a time-division multiplexer (MUX), a second laser emitter, a second sensor, and a second converter device, and
the second laser emitter emits a second laser beam;
the second sensor detects a reflection of the second laser beam;
the second converter device converts an output of the second sensor from a current to a second voltage signal representing the reflection of the second laser beam;
the MUX time-division multiplexes the first voltage signal and the second voltage signal, and passes the multiplexed first and second voltage signals to the ADC.

10. The LIDAR device of claim 9, wherein:
the ADC is further configured to measure a plurality of samples of the second voltage signal;
the splining module is further configured to generate a representation of the second voltage signal using the second plurality of samples;
the peak detection module is further configured to determine a peak magnitude of the representation of the second voltage signal and to determine a time at which the peak magnitude of the representation of the second voltage signal occurred;
the processing module is further configured to generate LIDAR information from the peak magnitude and a time-of-flight from emitting the second laser beam to the time which the peak magnitude of the representation of the second voltage signal occurred.

11. The LIDAR device of claim 10 further comprising a third and a fourth laser emitter, sensor, and converter device, and wherein
the ADC is a 250-500 mega-samples per second ADC,
the MUX is a 4×1 multiplexer, and
the operations of claim 10 are additionally performed for the third and the fourth laser emitter, sensor, and converter device.

12. The LIDAR device of claim 10, further comprising a third, fourth, fifth, sixth, seventh, and eighth laser emitter, sensor, and converter device, and
the ADC has similar sampling rate as in previous configuration,
the MUX is an 8×1 multiplexer, and
the operations of claim 10 are additionally performed for the third, fourth, fifth, sixth, seventh, and eighth laser emitter, sensor, and converter device.

13. An autonomous driving vehicle (ADV), comprising:
a light detection and range (LIDAR) device, wherein the LIDAR device comprises:
a controller comprising a processor, memory, storage, one or more communication interfaces, one or more analog to digital convertors (ADCs), and one or more timers, the memory comprising executable instructions that, when executed by the processor, configure the controller to implement a splining module, a peak detection module, and a processing module;
a first laser transmitter, coupled to a first timer of the one or more timers, to emit a first laser beam;
a first sensor that detects a reflection of the first laser beam;
a first converter device that converts an output of the first sensor from a current to a first voltage signal representing the reflection of the first laser beam, the first converter communicatively coupled to the first sensor and the controller;
a first analog-to-digital converter (ADC) of the one or more ADCs of the controller configured to measure a first plurality of sample points from the first voltage signal;
the splining module configured to generate a representation of the first voltage signal using the first plurality of sample points;
the peak detection module configured to determine a peak magnitude of the first voltage signal using the representation of the first voltage signal, and to determine a time at which the peak magnitude of the reflection of the first laser beam occurred;
the processing module coupled to the ADC, the splining module, and the peak detection module, the processing module configured to generate LIDAR information for the peak magnitude and a time-of-flight from emitting the first laser beam to the time at which the peak magnitude of the reflection of the first laser beam occurred; and
a perception and planning system coupled to the LIDAR device and configured to utilize the LIDAR information to perceive a driving environment surrounding the ADV and to control the ADV to navigate the driving environment.

14. The ADV of claim 13, wherein the first sensor comprises an avalanche photodiode.

15. The ADV of claim 13, wherein the first converter device comprises a transimpedance amplifier.

16. The ADV of claim 13, wherein the ADC samples the first voltage signal at a rate between 250 mega-samples per second and 500 mega-samples per second.

17. The ADV of claim 13, wherein the processing module is further configured to correlate the peak magnitude of the representation of the first voltage signal to an intensity of the reflected first laser beam.

18. The ADV of claim 13, wherein the LIDAR device further comprises a time-division multiplexer (MUX), a second laser emitter, a second sensor, and a second converter device, and:
the second laser emitter emits a second laser beam;
the second sensor detects a reflection of the second laser beam;
the second converter device converts an output of the second sensor from a current to a second voltage signal representing the reflection of the second laser beam;
the MUX time-division multiplexes the first voltage signal and the second voltage signal, and passes the multiplexed first and second voltage signals to the ADC.

19. The ADV of claim 13, wherein:
the ADC is further configured to measure a plurality of samples of the second voltage signal;
the splining module is further configured to generate a representation of the second voltage signal using the second plurality of points;

the peak detection module is further configured to determine a peak magnitude of the representation of the second voltage signal and to determine a time at which the peak magnitude of the representation of the second voltage signal occurred;

the processing module is further configured to generate LIDAR information from the peak magnitude and a time-of-flight from emitting the second laser beam to the time which the peak magnitude of the representation of the second voltage signal occurred.

20. A computer-implemented method, practiced on a LIDAR device comprising a controller having a processor, a memory, storage, one or more communications interfaces, one or more analog to digital converts (ADCs), and one or more timers, the controller communicatively coupled to a laser emitter, a sensor, and a converter device, the memory comprising executable instructions that, when executed by the controller, configure the controller to implement a splining module, a peak detector module, and a processing module that is coupled to the ADC, splining module, and peak detector module, the method comprising:

emitting an initial laser beam by the laser emitter;

detecting by the sensor a reflection of the initial laser beam;

converting, by the converter device, an output of the sensor from a current to a first voltage signal representing the reflection of the initial laser beam;

measuring, by the ADC, a first plurality of sample points from the first voltage signal;

generating, by the splining module, a representation of the first voltage signal using the first plurality of sample points;

determining, by the peak detector module, a peak magnitude of the first voltage signal using the representation of the first voltage signal, and determining a time at which the peak magnitude of the reflection of the initial laser beam occurred;

generating, by the processing module, LIDAR information for the peak magnitude and a time-of-flight from emitting the initial laser beam to the time at which the peak magnitude of the reflection of the first laser beam occurred, wherein LIDAR information is utilized to navigate the ADV responsive to one or more obstacles detected by the LIDAR device.

21. The method of claim 20, wherein the sensor comprises an avalanche photodiode.

22. The method of claim 20, wherein the converter device comprises a transimpedance amplifier.

23. The method of claim 20, wherein the processing module is further configured to correlate a peak magnitude of the representation of the first voltage signal to an intensity of the reflected initial laser beam.

* * * * *